Nov. 20, 1945.　　　R. LAPSLEY　　　2,389,520
TORQUE CONVERTER
Filed July 17, 1941
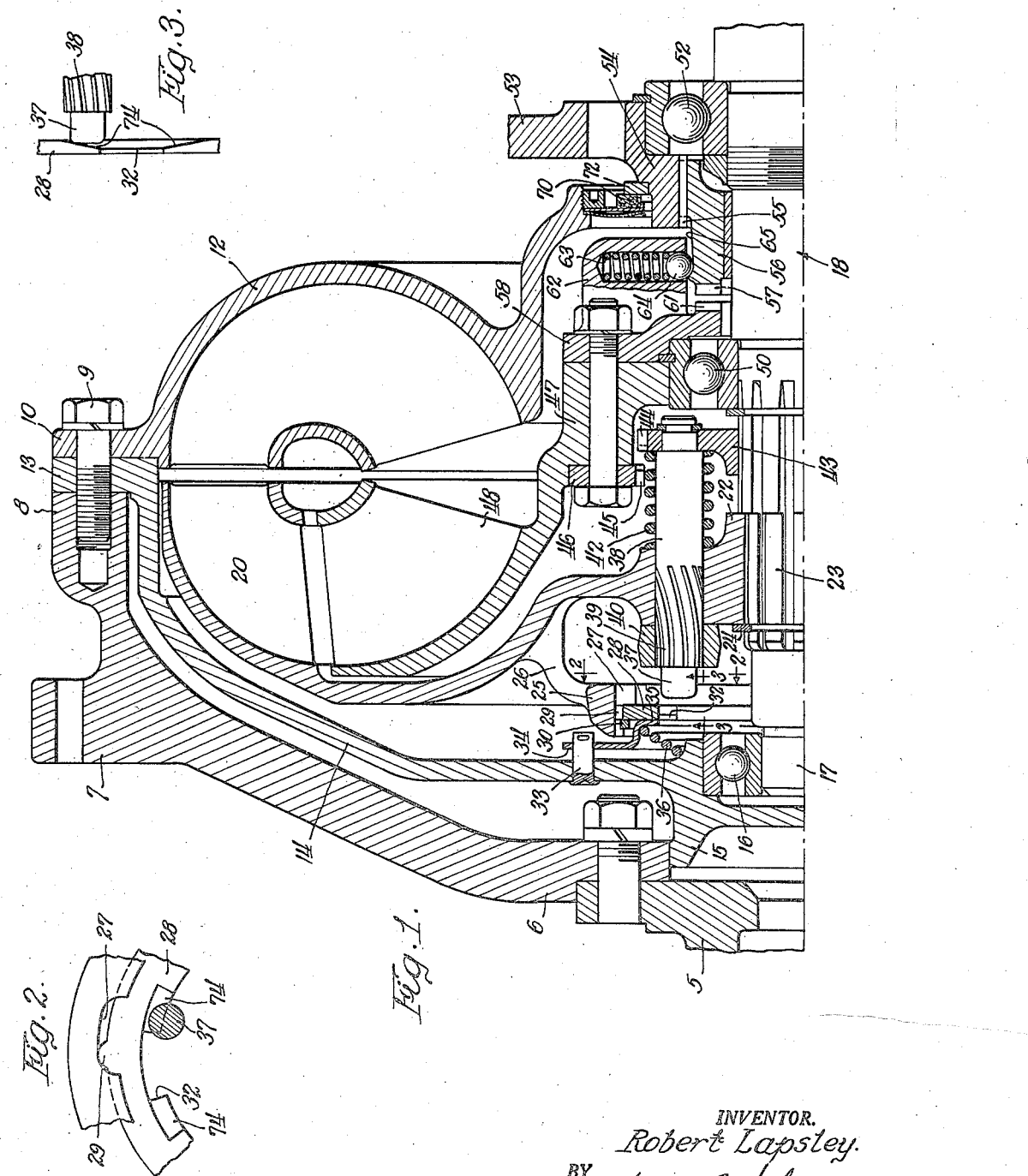

Patented Nov. 20, 1945

2,389,520

UNITED STATES PATENT OFFICE 2,389,520

TORQUE CONVERTER

Robert Lapsley, Berrien Springs, Mich., assignor to Clark Equipment Company, Berrien, Mich., a corporation of Michigan Application July 17, 1941, Serial No. 402,766

5 Claims. (Cl. 60—54)

This invention relates to torque converters, and more particularly is directed to a torque converter constructed and arranged so that under predetermined conditions of speed and torque, the converter will be so actuated as to act solely as a fluid coupling, the stator and rotor being locked together for conjoint drive.

As is well known in this field, a torque converter has definite limits of efficiency, and while it will operate to produce the desired ratio of torque conversion within a certain range, its efficiency then drops off and it is desirable that at this point the converter be rendered inoperative so far as a torque converter characteristic is concerned. However, it is still desirable to provide for the use of a fluid connection between the power source and the driven members, and for this reason the present invention contemplates changing the torque converter to a fluid coupling under certain conditions of speed which are selected to allow this change to take place at the vehicle speeds found desirable, depending upon the characteristics of the converter and the ratios in the driving train of the vehicle.

Considered more in detail, the present invention provides a torque converter construction consisting of the usual impeller, rotor and stator, the rotor being arranged for connection to the driven shaft. Carried by the rotor is a clutch member controlled by suitable springs and centrifugal mechanism which operates to clutch the rotor and stator together for conjoint rotation under predetermined conditions of speed and load. The particular construction provided requires that the clutching action be delayed until the driving torque has been relieved, as by lifting the foot from the accelerator pedal or whenever the driven shaft tends to reach or slightly overrun the driving shaft. If the speed conditions at this point are such as to actuate the governor controlled clutch, the clutch is then capable of operation for clutching the rotor and stator together.

One object of the present invention, therefore, is to provide speed controlled clutch means for changing a torque converter to a fluid coupling, which clutch means is operable only under certain torque conditions existing between the driving and driven elements.

Another object of the present invention is to provide a blocking ring controlled by the relative torque of the driving and driven elements which will prevent operation of the clutching elements unless the driving and driven elements are substantially at synchronous speed.

A still further object of the present invention is to provide a simplified construction in which adjustments for cutting in and cutting out of the clutching member can be controlled readily for operation under desired conditions of speed.

Still another advantage of the present invention is the provision of a clutch mechanism for preventing the stator from turning rearwardly due to the reaction of the torque converter, and including a mechanism associated with the clutch which will allow free forward rotation of the stator when locked to the rotor for operation as a fluid coupling.

Other objects and advantages of the present invention, including desirable features of design and assembly, will be more apparent from the following detailed description which, taken in conjunction with the accompanying drawing, will disclose to those skilled in the art the particular construction and operation of the preferred form of the present invention.

In the drawing:

Figure 1 is a sectional view through a torque converter embodying the present invention;

Figure 2 is an enlarged detail view taken substantially on line 2—2 of Figure 1; and Figure 3 is an enlarged view taken substantially on line 3—3 of Figure 1.

Referring now in detail to the disclosure shown in the drawing, there is provided a shaft 5 which is driven from the source of power, such as an internal combustion engine or the like, and which has bolted thereto the flange portion 6 of a flywheel and starter gear mechanism 7 including an axially directed annular ring portion 8 adapted to receive the threaded stud 9. Mounted intermediate the ring 8 and the peripheral flange 10 of the impeller member 12 is a normally directed flange portion 13 of a housing member 14 which is piloted at its inner end by the hub portion 15 extending within the flange 6, and carries a suitable bearing 16 for supporting the stud end 17 of a driven shaft 18. The member 14 cooperates with the member 12 to form a housing for the fluid torque converter, and rotates with the flywheel 7 and the impeller 12 as a unit.

Within the housing formed by the impeller and the member 14, there is located the rotor or driven member of the converter, indicated at 20, which has a hub portion 22 splined on the reduced splined portion 23 of the shaft 18 and held against axial movement thereon by means of the snap ring 24. The rotor 20 is also provided with an offset annular ring portion 25 supported by means of suitable integrally formed arms 26 from the inner part of the rotor and extending forwardly of the hub 22 thereof. The annular ring 25 is provided with an inwardly radial shoulder having a pair of diametrically radially cut-out notched portions 27 shown more in detail in Figure 2. A blocking ring 28 is disposed against the shoulder, the ring 28 having ear portions 29 operable to move circumferentially from one limiting position to the other within the notches 27. The ring 28 is held in position relative to the shoulder on annulus 25 by means of the snap ring 30, and is provided in its inner periphery with oppositely disposed notched out portions 32 for a purpose to be described more in detail hereinafter.

The housing member 14 is provided with a series of circumferential studs 33 which carry thereon an annular spider or plate 34 having an inwardly directed offset portion 35 bearing against the adjacent radial face of the ring 28. The flange portion 35 of the spider 34 is held in frictional engagement with this face by means of the spiral spring member 36 biased between the hub of the member 14 and the spider adjacent the bearing 16. It will be apparent that with the construction thus far described, whenever the housing 14, which is conjointly rotated with the shaft 5, is rotating in a counterclockwise direction as viewed from the left hand end of Figure 1, at a greater speed than the rotor 20, the frictional engagement between the flange 35 and ring 25 will drag the ring into the position shown in Figure 2, in which the ear 29 is at the left hand side of the notch 27. This in turn holds the notch 32 in the inner periphery of the ring 28 out of alinement with the head end 37 of a stud member 38, preventing any movement of the stud member 38 to the left, as viewed in Figure 1, into the notch 32. The stud member 38 is provided with helical splines indicated at 39 threaded into the hub portion 22 of the rotor 20 and carrying at the outer end thereof the centrifugally actuated weight members 40. These members are in the form of levers secured at one end on splines 39 and having weighted free ends which, upon predetermined speed of rotation of the rotor 20, move outwardly away from the axis of the shaft 18 and tend to thread the stud members 38 axially to the left toward the ring 28. Suitable governor springs 42 are biased between the hub 22 of the rotor 20 and a clutch disc 43 which is splined on the shaft 18 and which carries at its outer periphery the clutch teeth 44. So long as the housing 14 connected to the drive shaft 5 tends to overrun the rotor 20, the blocking ring 28 stays in a position preventing axial movement of the studs 38 into the notches 32, thereby preventing clutching engagement between the clutch teeth 44 and the clutch teeth 45 carried by the ring gear 46 bolted to the hub portion 47 of the stator 48. When there is a reversal of torque or the shaft 5 assumes a speed slightly less than the speed of rotor 20, as in coasting or when the foot is lifted from the foot accelerator pedal, the rotor 20 tends to overrun the housing 14 and the frictional drag between the flange 35 and ring 28 tends to reverse the ring 28, rotating it clockwise, as viewed in Figure 2, to move the ear 29 toward the opposite end of the notch 27. This in turn causes the notch 32 in the inner periphery of the ring to move into position alined with the head end 37 of stud 38, thereby allowing the centrifugally actuated stud to move to the left into a position effecting clutching engagement between the rotor and stator of the torque converter, thereby locking these two members together for conjoint rotation and changing the torque converter to a fluid coupling.

The stator 48 has the hub portion 47 thereof mounted on the outer race of the bearing assembly 50, which in turn journals the shaft 18 intermediate its ends. The rear end of the shaft 18 is journalled by means of the bearing assembly 52 in the transverse web portion 53, which forms a partition between the torque converters and the transmission or drive train. The flange or web 53 is provided with an axial extension 54, which is provided with internal helical splines 55 receiving the corresponding external splines of an axial movable clutch sleeve 56 having the clutch ratchet teeth 57 at the inner end thereof.

The hub portion 47 of the stator is provided with a cooperating clutch member 58 bolted thereto and having a portion secured about and forming part of the bearing seat for the bearing 50. Suitable circumferentially spaced bosses 62 are provided on the member 58 and are recessed to receive the springs 63 and the ball plungers 64, these plungers riding on the tapered surface 65 of the sleeve 56. The ratchet teeth 57 of the sleeve 56 and the teeth 61 of the member 58 are arranged so that when engaged, the stator will be positively held against rotation in the direction opposite to the rotation of the housing 6, but upon any tendency of the stator 48 to rotate forwardly, the teeth will be moved apart and the balls, through the frictional drag, insure axial movement of the sleeve to the right through the action of splines 55, as viewed in Figure 1, and normally hold the clutch teeth 57 out of engagement with the clutch teeth 61. When there is a tendency for the stator to rotate in a reverse direction, this will result in threading the sleeve 56 to the left outwardly on the splines 55 due to the frictional drag of the balls on the tapered hub. This type of clutch construction functions in the same manner as described in connection with the clutch construction shown in the patent to Burrows, Lapsley and Williams, No. 2,150,150 issued March 14, 1939, and provides a means for restraining the stator against reverse rotation but allowing free forward rotation thereof to accommodate the clutching of the rotor and stator together to convert the torque converter to a fluid coupling. It is to be understood that any suitable type of one-way clutch may be employed for this purpose.

Suitable sealing means is provided between the impeller 12 and the transverse partition 53, this sealing means including the contacting rings 70 and 72 which are spring pressed together to form a seal preventing the escape of fluid from within the converter outwardly toward the web 53.

It will be noted from Figure 3 that the ring 28 adjacent the notched portions 32 thereof is provided with tapered surfaces, indicated at 74, these surfaces facilitating the sliding of the stud head 37 into the opening 32 whenever the frictional drag on the ring 28 is reduced. This in turn facilitates the action of the centrifugally responsive members 40 in engaging the clutch when the rotor has reached a predetermined speed, since any slight reversal of torque will be sufficient to allow studs to pass into the slots 32, accommodating the movement of the clutch member 43 into engagement with the gear 46.

In the normal operation of the device disclosed in the drawing, the impeller 12 is rotated conjointly with the crankshaft 5, and fluid within the torque converter is circulated around from the impeller 12 through the rotor 20 and the stator 48 in a counterclockwise direction. The stator 48, due to the reaction placed thereon by the fluid, tends to rotate rearwardly, and as a result, the one-way clutch provided by the ratchet teeth 57—61 locks the stator against reverse rotation through the splines 55. As the engine speeds up, the torque conversion decreases, and when the torque converter passes through the peak of its efficiency curve, there is a tendency for the stator 48 to start rotating forwardly with the rotor and impeller, although it is obvious that it can never rotate forwardly at a speed approaching that of the rotor. This causes the teeth 61 to force the teeth 57 to the right, disengaging the one-way clutch. This action is entirely independent of any of the control systems to be described hereinafter, and if considered alone, would merely result in lengthening out the period during which the torque converter drops in efficiency.

However, to provide the coupling of the rotor and stator together in order to convert the torque converter to a coupling, a second control system is provided in which the weighted levers 40 operating through splines 39 move the plunger 38 to the left. However, they are prevented from moving far enough to the left to cause engagement of teeth 44 and 45 by the blocking ring 28 until there is a reversal of torque between the impeller and rotor. This is caused by releasing the accelerator, which decreases engine speed and at some point will cause the rotor 20 to approach and tend to exceed the speed of the impeller 12. At this instant, the drag on the blocking ring 28 is reversed and the plunger ends 37 can then pass through the opening 32, allowing teeth 44 and 45 to engage. This is not to be confused with the critical speed but is controlled solely by reversal of torque through the converter caused by release of the accelerator and can function at any point along the operating curve of the converter, depending upon the weight of the levers 40 and the strength of springs 42. The teeth 44 and 45 are each alternately long and short teeth to facilitate this clutching engagement. It is therefore apparent that with this construction, regardless of whether or not the stator 48 is held against reverse rotation or is starting to rotate forwardly with the torque converter, the clutching engagement between the stator and rotor is controlled by the reversal of torque and the speed of rotation of the rotor which are the only two factors or conditions determining the coupling of the rotor and stator together.

It is therefore believed apparent that I have provided a novel torque converter construction employing relatively few parts, and in which means is provided responsive to predetermined speed and torque conditions for changing the converter into a fluid coupling without any control on the part of the operator. This is of distinct advantage in providing for smooth but efficient transfer of power from the engine to the drive train of the vehicle, using the torque varying capacity of the converter during the initial stages of acceleration and then changing to a fluid coupling to provide a smooth driving connection.

I am aware that various changes may be made in certain details of this construction, and I therefore do not intend to be limited except as defined by the scope and spirit of the appended claims.

I claim:

1. In combination, an impeller, a driven shaft, a rotor having a hub portion splined on said shaft, and driven by said impeller, a stator restrained against reverse rotation but free to rotate forwardly having a hub portion journalled on said shaft, a clutch gear on the hub of said stator, a mating clutch gear splined for axial movement on said shaft and normally biased out of engagement with said stator gear, and spirally threaded pin means threaded through the hub portion of said rotor for actuating said mating gear into engagement with said stator gear and including centrifugally responsive members adapted to overcome said bias on said mating gear at a predetermined speed of rotation of said rotor.

2. In combination, in a torque converter comprising an impeller, a rotor driven thereby, and a stator restrained against reverse rotation but free to rotate forwardly, a first clutch gear carried by the hub of said stator, a mating clutch gear conjointly rotatable with said rotor, axially shiftable means for said mating gear having centrifugally responsive members carried by the hub of said rotor for urging said mating gear into engagement with said stator gear when said rotor reaches a predetermined speed, spring means imposing a predetermined bias on said shiftable means for holding said means against shifting below said predetermined speed, and blocking means for preventing engaging movement of said axially shiftable means until there is a reversal of torque between said impeller and rotor at or above said predetermined speed, said blocking means comprising a ring carried by said rotor hub and circumferentially shiftable relatively thereto, a friction member carried by said impeller holding said ring in blocking position as long as said impeller tends to overrun said rotor and operative to shift said ring out of blocking position upon reversal of said overrun.

3. In a torque converter having an impeller, a rotor and a stator, means for clutching said rotor and stator together for conjoint rotation under predetermined conditions of torque and speed, comprising axially shiftable pins carried in the hub of said rotor, a clutch gear carried by said pins and operable to engage a stator clutch gear, spring means imposing a predetermined bias on said pins holding said gears out of engagement, speed responsive means carried by said pins and operable upon said rotor reaching a predetermined speed for overcoming said bias to urge said gears into engagement.

4. In a torque converter having an impeller, a rotor and a stator, means for clutching said rotor and stator together for conjoint rotation under predetermined conditions of torque and speed, comprising axially shiftable pins carried in the hub of said rotor, a clutch gear carried by said pins and operable to engage a stator clutch gear, spring means imposing a predetermined bias on said pins holding said gears out of engagement, speed responsive means carried by said pins and operable upon said rotor reaching a predetermined speed for overcoming said bias to urge said gears into engagement and blocking means for preventing said engagement until there is a reversal of torque between said impeller and rotor.

5. In combination, a torque converter having an impeller, a rotor, and a stator restrained against reverse movement but free to move forwardly, a driven shaft upon which said rotor is splined, an axially shiftable gear on said shaft conjointly rotatable therewith and having actuating means carried in the hub of said rotor, a mating gear carried on the hub of said stator, spring means normally holding said gears out of engagement, speed responsive means on said actuating means for urging said shiftable gear toward engaging position, and blocking means preventing gear engagement including a first member carried by said rotor and shiftable circumferentially relative thereto, and a second member carried by said impeller frictionally engaging said first member and operable to shift it out of blocking position only when said rotor tends to overrun said impeller.

ROBERT LAPSLEY.